Nov. 17, 1964     E. MARTIN     3,157,415
INTERCONNECTING CLAMP FOR TOOL AND CULTIVATOR BAR
Filed July 6, 1962
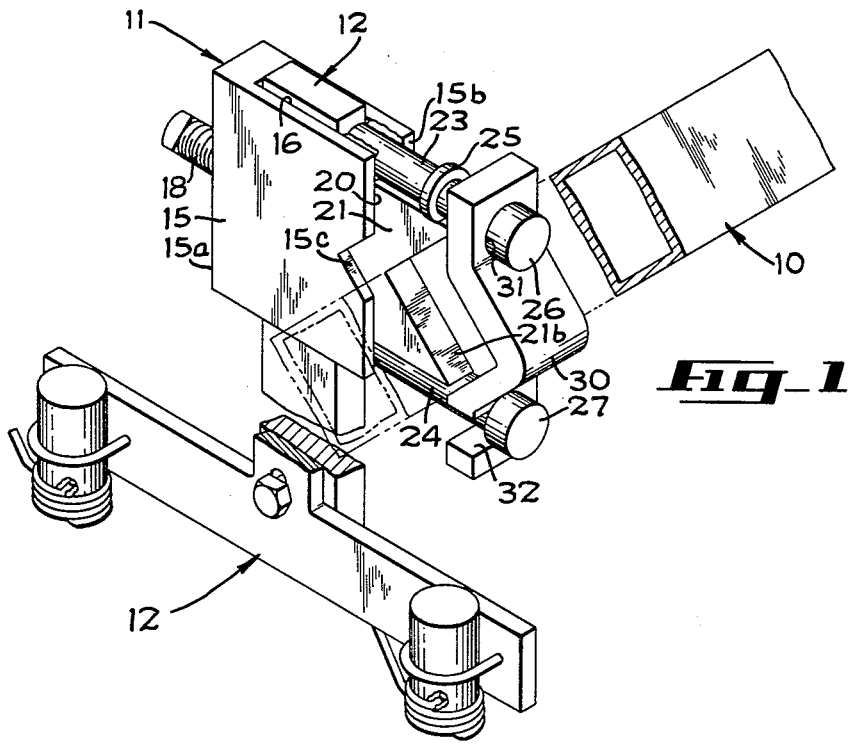
Fig_1
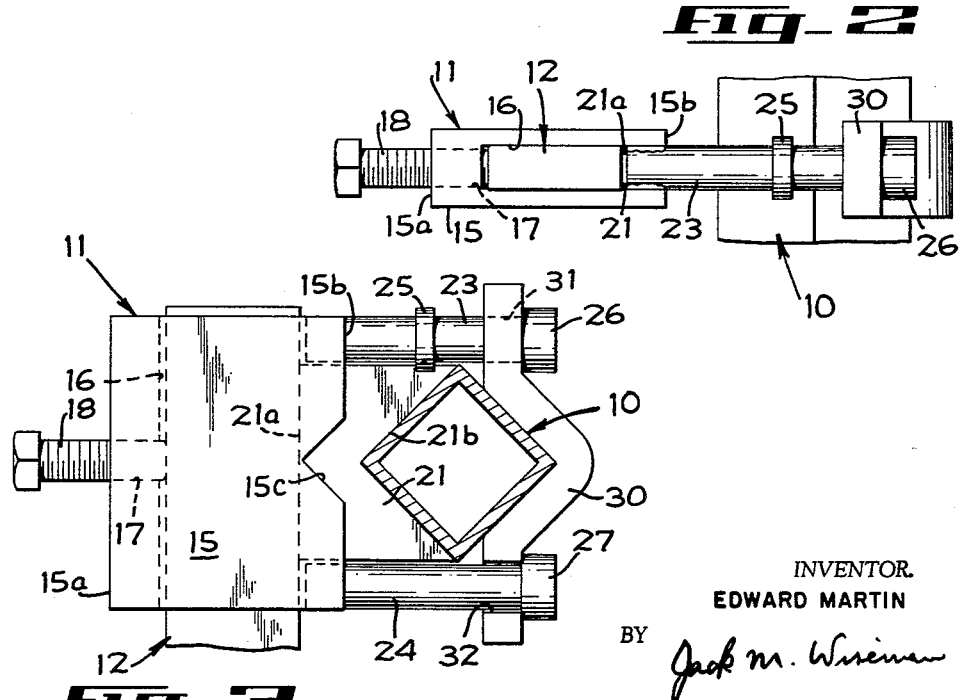
Fig_2
Fig_3
INVENTOR.
EDWARD MARTIN
BY
Jack M. Wiseman
ATTORNEY

United States Patent Office 3,157,415
Patented Nov. 17, 1964

3,157,415
INTERCONNECTING CLAMP FOR TOOL AND CULTIVATOR BAR
Edward Martin, 8141 Fairview Road, Hollister, Calif.
Filed July 6, 1962, Ser. No. 208,016
4 Claims. (Cl. 287—54)

The present invention relates in general to clamps, and more particularly to a clamp for securing a tool to a cultivator bar.

An object of the present invention is to provide an improved clamp for attaching a tool to a cultivator bar.

Another object of the present invention is to provide a quick acting clamp for securing a tool to the bar of a cultivator.

Another object of the present invention is to provide a self-centering clamp for attaching a tool to a beam of a cultivator.

Another object of the present invention is to facilitate the securing of a tool to a cultivator beam.

Other and further objects and advantages of the present invention will be apparent to one skilled in the art from the following description taken in conjunction with the accompanying drawings, in which:

FIG. 1 is a perspective view of the clamp of the present invention shown in conjunction with a cultivator bar and a cultivator tool.

FIG. 2 is a top view of the clamp shown in FIG. 1.

FIG. 3 is a side elevational view of the clamp shown in FIGS. 1 and 2.

Illustrated in FIGS. 1–3 is a conventional cultivator bar 10 on which is mounted the clamp 11 of the present invention. The clamp 11 secures a suitable cultivator tool 12 to the cultivator bar 10.

The clamp 11 of the present invention comprises a body 15 having substantially a rectangular configuration. Formed in the body 15 and extending therethrough is a suitable vertically disposed end opening 16 for receiving the shank of any suitable cultivator tool, such as the weed puller 12. The walls of the body 15 surrounding the opening 16 form a generally rectangular passageway.

Formed in a side wall 15a of the body 15 is a threaded aperture 17 for receiving a suitable locking screw 18. The aperture 17 is horizontally disposed and communicates with the opening 16. The screw 18 is arranged to engage a side wall of the shank of the tool 12 for urging the tool 12 to move laterally relative to the body 15 and for locking the tool 12 within the opening 16 of the body 15.

An opposite side wall 15b of the body 15 is formed with an opening 20, which communicates with the opening 16 arranged to receive a sliding block 21 of the clamp 11. The sliding block 21 is disposed in an upright position and is adapted to be received by the side opening 20 for sliding movement in a transverse direction relative to the body 15. The sliding block 21 is formed with an upright side wall 21a that engages the side wall of the shank of the tool 12, which is opposite to the side wall of the shank of the tool 12 engaged by the locking screw 18. An opposite side wall 21b of the sliding block 21 has an angular configuration suitable for gripping an adjacent portion of the horizontally disposed cultivator bar 10 (FIG. 3). The body 15 has an angle portion 15c formed in the end 15b, which is like the angular configuration of the slidable block 21.

Fixed to the body 15, such as by welding, and projecting laterally from the side wall 15b at opposite vertical extremities thereof are parallel cylindrical rails 23 and 24. The rails 23 and 24, which may be integrally formed with the body member 15, are horizontally disposed and vertically spaced so that the sliding block 21 may be moved laterally therebetween. Fixed to or integrally formed with the sliding block 21 is an ear 25 comprising a suitable opening to receive the rail 23, whereby the sliding block 21 is guided in its sliding movement between the rails 23 and 24 through the opening 20 and into the opening 16.

The distal ends of the rails 23 and 24, respectively, are formed with enlarged diameter portions 26 and 27, which serve as stops or arresting sections. Supported by the rails 23 and 24 is a retaining member 30. The retaining member 30 is disposed between the stops 26, 27 and the block 21. At one end of the retaining member 30 is a cylindrical opening 31 for receiving the rail 23. At the other end of the retaining member 30 is a slotted opening 32 for receiving the rail 24. The central portion of the retaining member 30 has an angular configuration complementing and facing the angular configuration of the sliding block 21 for gripping an adjacent portion of the horizontally disposed cultivator bar 10 (FIG. 3). The retaining member 30 is supported by the rails 23 and 24 for sliding movement toward and away from the body member 15 and is also arranged for pivotal movement about the axis of the rail 23.

In employing the clamp 11 of the present invention, the body 15 is disposed in an upright position and the retaining member 30 is pivoted about the axis of the rail 23 with the free end thereof away from the rail 24. The block 21 is slidably moved toward the body 15. Thereupon, the clamp 11 is moved so that the horizontal cultivator bar 10 is positioned between the rails 23 and 24, and the horizontal rails 23 and 24 are disposed transversely relative to the cultivator bar 10. The retaining member 30 is then pivoted to the position wherein the slot 32 thereof receives the rail 24. At this time, the retaining member 30 is in abutment with the stops 26 and 27.

Subsequently, the shank of the vertical tool 12 is moved upwardly and inserted into the opening 16 of the body 15. If the sliding block 21 is in the path of travel, it is then moved toward the retaining member 30. An operator now rotates the locking screw 18 to urge the tool 12 toward the block 21 and to lock the tool within the opening 16. This action causes the block 21 to automatically slide under the urgency of the tool 12 toward the cultivator bar 10 causing the block 21 and the retaining member 30 to self-center and also causing both the block 21 and the retaining member 30 to grip the cultivator bar 10 in clamping engagement for securing the cultivator tool 12 to the bar 10.

From the foregoing, it is to be observed that a single adjusting screw effects the securing of the cultivator tool to the clamp and also the gripping engagement between the clamp and the cultivator bar. Through this action, the clamp is self-centering and the sliding block thereof is automatically moved into clamping engagement with the cultivator bar. Thus, the clamp of the present invention enables rapid clamping action to quickly effect the changing of tools on a cultivator.

It is to be understood that modifications and variations of the embodiment of the invention disclosed herein may be resorted to without departing from the spirit of the invention and the scope of the appended claims.

Having thus described my invention, what I claim as new and desire to protect by Letters Patent is:

1. A clamp for securing a tool to a cultivator bar comprising a body formed with an end opening for receiving a tool, said body being formed with a lateral opening communicating with said end opening, a slidable block received by said lateral opening and having a portion thereof projectable into said end opening, rails fixed to said body and projecting therefrom adjacent opposite ends of said lateral opening and in the direction of sliding movement of said slidable block, means on said slidable block for receiving one of said rails to support said slidable block in a sliding guiding movement, said slidable block being disposed between said rails in its sliding guiding movement, a retaining member supported by said rails and facing said slidable block for gripping a cultivator bar therebetween, said retaining member being formed with an opening to receive said one rail to be supported thereby, and locking means supported by said body for engaging the tool received by said end opening to urge said tool to move into engagement with said slidable block for urging said slidable block to move toward said retaining member for securely gripping the cultivator bar therebetween and for locking said tool in said end opening.

2. A clamp for securing a tool to a cultivator bar comprising a body formed with an end opening for receiving a tool, said body being formed with a lateral opening communicating with said end opening, a slidable block received by said lateral opening and having a portion thereof projectable into said end opening, rails fixed to said body and projecting therefrom adjacent opposite ends of said lateral opening and in the direction of sliding movement of said slidable block, an ear fixed to said slidable block and having an opening to receive one of said rails for supporting said block in its sliding guided movement, said slidable block being disposed between said rails in its sliding guiding movement, a retaining member supported by said rails and facing said slidable block for gripping a cultivator block therebetween, said retaining member being formed with openings therein to receive said rails to be supported thereby, and locking means supported by said body for engaging the tool received by said end opening to urge said tool to move into engagement with said slidable block for urging said slidable block to move toward said retaining member for securely gripping the cultivator bar therebetween and for locking said tool in said end opening.

3. A clamp for securing a tool to a cultivator bar comprising a body formed with an end opening for receiving a tool, said body being formed with a lateral opening communicating with said end opening, a slidable block received by said lateral opening and having a portion thereof projectable into said end opening, rails fixed to said body and projecting therefrom adjacent opposite ends of said lateral opening and in the direction of sliding movement of said slidable block, a retaining member supported by said rails and facing said slidable block for gripping a cultivator bar therebetween, said retaining member being formed with a cylindrical opening at one end thereof for receiving one of said rails and with a slotted opening at another end thereof for receiving the other of said rails, said retaining member being pivotally supported by said one rail for movement to and from latching engagement with said other rail, and locking means supported by said body for engaging the tool received by said end opening to urge said tool to move into engagement with said slidable block for urging said slidable block to move toward said retaining member for securely gripping the cultivator bar therebetween and for locking said tool in said end opening.

4. A clamp for securing a tool to a cultivator bar comprising a body formed with an end opening for receiving a tool, said body being formed with a lateral opening communicating with said end opening, a slidable block received by said lateral opening and having a portion thereof projectable into said end opening, rails fixed to said body and projecting therefrom adjacent opposite ends of said lateral opening and in the direction of sliding movement of said slidable block, an ear fixed to said slidable block and having an opening to receive one of said rails for guiding said block in its sliding guided movement, said slidable block being disposed between said rails in its sliding guiding movement, a retaining member supported by said rails and facing said slidable block for gripping a cultivator bar therebetween, said retaining member being formed with a cylindrical opening at one end thereof for receiving one of said rails and with a slotted opening at another end thereof for receiving the other of said rails, said retaining member being pivotally supported by said one rail for movement to and from latching engagement with said other rail, and locking means supported by said body for engaging the tool received by said end opening to urge said tool to move into engagement with said slidable block for urging said slidable block to move toward said retaining member for securely gripping the cultivator bar therebetween and for locking said tool in said end opening.

References Cited in the file of this patent

UNITED STATES PATENTS

| 2,490,237 | Silver | Dec. 6, 1949 |

FOREIGN PATENTS

| 173,493 | Austria | Dec. 27, 1952 |
| 572,487 | Great Britain | Oct. 10, 1945 |